United States Patent [19]

Jabarin

[11] Patent Number: 4,522,779

[45] Date of Patent: Jun. 11, 1985

[54] METHOD FOR PRODUCTION OF POLY(ETHYLENE TEREPHTHALATE) ARTICLES

[75] Inventor: Saleh A. Jabarin, Holland, Ohio

[73] Assignee: Owens-Illinois, Inc., Toledo, Ohio

[21] Appl. No.: 555,759

[22] Filed: Nov. 28, 1983

[51] Int. Cl.$^3$ .............................................. B29C 17/07
[52] U.S. Cl. ..................................... 264/530; 264/535
[58] Field of Search ............... 264/523, 529, 530, 532, 264/535; 425/530

[56] References Cited

U.S. PATENT DOCUMENTS

| 4,108,937 | 8/1978 | Martinen et al. | 264/529 |
| 4,385,089 | 5/1983 | Bonnebat et al. | 264/529 |

FOREIGN PATENT DOCUMENTS

| 56-105935 | 8/1981 | Japan | 264/530 |
| 57-53326 | 3/1982 | Japan | 264/529 |
| 2108899 | 5/1983 | United Kingdom | 264/530 |

*Primary Examiner*—Jan Silbaugh
*Attorney, Agent, or Firm*—Thomas L. Farquer; M. E. Click

[57] ABSTRACT

Improved plastic containers and process for their production are disclosed. In one embodiment, containers are blow molded in a first hot blow mold, then reblown to a larger size in a second cold mold of larger volume than the first hot mold. Such containers have improved physical properties, particularly very high hoop yield stresses. In a second embodiment, containers are blow molded in a hot blow mold, then reblown to a larger size in a second hot blow mold. Such containers show high resistance to shrinkage and gross deformation in shape upon exposure to high temperatures.

8 Claims, No Drawings

METHOD FOR PRODUCTION OF POLY(ETHYLENE TEREPHTHALATE) ARTICLES

BACKGROUND OF THE INVENTION

This invention relates to improved methods of making hollow, biaxially oriented, heat-set partially crystalline articles. In another aspect, it relates to biaxially oriented, heat-set hollow poly(ethylene terephthalate) containers having excellent mechanical properties and low permeabilities to carbon dioxide and oxygen gas. The containers according to the present invention exhibit excellent gas barrier properties, that is low gas permeabilities, and significant mechanical property improvement in hoop yield strength, thermal stability and creep-resistant over prior containers.

In order to improve several physical properties of hollow articles such as containers made from poly(ethylene terephthalate), it has been suggested that biaxially oriented poly(ethylene terephthalate) hollow articles, made by orientation blow molding from a preform or parison under conditions to provide biaxial orientation and concomitant crystallization, be further heat-treated at higher temperatures than the orientation blowing temperature to further increase the density by increasing the crystallinity of the hollow article. Such increasing of the density or crystallinity by heating after shaping under orientation conditions is commonly known as heat-setting.

Wyeth et al. in U.S. Pat. No. 3,733,309 suggests such a process. However, the heat-setting process is mentioned only in passing and no specific examples including heat-setting are present in the patent. Of course, the extra step would ordinarily add considerable expense to the bottle making process. Such heat-setting processes typically take many minutes per container and are thus not well-suited to commercial speed container manufacture.

Collins in U.S. Pat. No. 4,039,641 discloses heat-setting containers of an organic crystallizable synthetic thermoplastic polymeric material. Among such materials disclosed are high density polyethylene, polypropylene homopolymers and copolymers and polyesters such as poly(ethylene terephthalate) and poly(butylene terephthalate), including polyesters such as ethylene terephthalate/isophthalate copolymers. In a preferred embodiment, heat-setting is accomplished by blowing the plastic parison in a heated blow-mold, preheated to the heat-setting temperature.

It is stated in the Collins patent that the heat-setting temperature used is that normally encountered in heat-setting of oriented films or fibers made from the given plastic material. It is not stated, however, what heat-setting temperatures are "normal" for making oriented films or fibers from poly(ethylene terephthalate).

It is also disclosed in Collins that after heat-setting, the container should be cooled down to a temperature, for instance, below about 60° C. In one example of Collins, the heat-setting temperature of the mold is 200° C. and in the other, it is 140° C.

In Japanese Patent Application No. 146,175, laid open Nov. 15, 1980, containers are stretch blow-molded under conditions to biaxially orient the polyester molecules. It is explained that as a result of the stretch blow-molding, the residual strain was large and that when heated subsequent to the molding, the residual strain was released, causing deformation of the container. To solve this problem, the reference recommends heat-setting the containers after blow-molding. It is also recommended that the heat-setting temperature in unstretched areas such as the neck be held to 95°–125° C. so that hazing will not occur in these areas. Other areas are heat-set at a higher temperature. It is recommended that the heat-setting of the highly strained areas of the container be in the range from 125° C. to 235° C.

In Japanese Patent Application No. 77,672, laid open June 21, 1979, is similar except that it is not taught to heat-set unoriented parts at a lower temperature than other parts. The highest temperature disclosed for heat-setting is 130° C. and in the only specific example, the oriented blow-molded container is heat-set by contacting with the hot blow-mold kept at 130° C. and then lowering the mold temperature to 100° C. to prevent container deformation when the container is discharged from the mold. In this reference, it is stated that hazing occurs when higher heat-setting mold temperatures are used.

In Japanese Patent Application No. 21,463, laid open Feb. 17, 1979, a blown poly(ethylene terephthalate) container was heat-set by heating the container to 140° C. while still within the blow-mold.

In Japanese Patent Application No. 78,267, laid open June 11, 1978, there is disclosed stretch blow-molding a thermoplastic resin, in the example specifically poly(ethylene terephthalate) to make a hollow article, and while the article is still in the mold to introduce hot gases for the purposes of heat-setting. In the example, the hot gas is at 180° C. The example does not disclose cooling the heat-set article before removal from the mold, but the description of the drawing does describe this as an alternative treatment, using normal temperature compressed gas to cool the molded piece.

In Japanese Patent Application No. 66,968, laid open May 29, 1979, methods of reducing residual strain in biaxially oriented blown containers are disclosed. The methods are applied to unidentified, saturated polyester resins. In all of the methods, the container is heated after being formed by biaxial orientation blow-molding by one method or another. After the heat treatment the container is cooled, but the temperature to which the container is cooled is not disclosed. The heating step apparently includes heating the neck portion of the container, since in one method the heating is by passing steam through channels which include channels next to the neck, and in another method heating is carried out by high temperature pressurization of the interior of the container, which of course includes the neck.

In Japanese Patent Application No. 78,268, laid open June 11, 1978, a stretch blow-molded hollow body, including those made from poly(ethylene terephthalate) is heat-set by introducing hot gas under pressure into the interior of the container while in the mold. After the heat-setting, normal temperature gas can be optionally blown into the article to cool the article before removal from the mold, or the heat-set body can simply be exhausted to atmospheric. In an example, the heated gas for heat-setting is at 200° C. In the specific example, no cooling before removal from the mold was disclosed. Again, the heating includes heating of the neck portion of the bottle.

In Japanese Patent Application No. 41,973, laid open Apr. 3, 1979, it is disclosed to heat-set stretch blow molded containers, including those made from poly(ethylene terephthalate) by heating the blown containers at a high temperature and then rapidly cooling them to room temperature. Heat treatment can be within the mold while under pressure and the heating can be by means of a hot mold. It is disclosed that the heat treatment should be such that the density of the container following the heat treatment is no greater than 1.40 gms./cc. In the example given, steam at 179° C. is used for heating the mold in the heating step.

U.S. Pat. No. 2,823,421 to Scarlett discloses heat-setting of poly(ethylene terephthalate) films using heat-setting temperatures of 150°–250° C. after orientation stretching. This patent does not state, however, what "normal" polyester film heat-setting temperatures are. It does disclose that for a film stretched three times in each direction that a heat-setting temperature of 200° C. is preferred by Scarlett.

German Patent No. 2,540,930 discloses heat-setting of hollow articles. The blank or parison is blow-molded at 70°–140° C. and then cooled in the mold to below 70° C. Thereafter, the container can be reheated to the heat-setting temperature in the same mold or in a different mold. The heat-setting temperature is said to be 140° C. or higher. In the disclosed process, the entire container including the neck is heated in the heat-setting step to the same temperature and the neck of the container crystallizes to an opaque state.

In the Brady et al. patent, U.S. Pat. No. 4,233,022, a container oriented by blow-molding of polyester at 75°–100° C. is heat-set. Heat-setting is accomplished in a hot mold at a suitable heat-setting temperature; examples of such temperatures are given as 150° to 220° C. The patent features controlling different zones of the container at different temperatures, so that all the sidewall of the container is at the maximum heat-setting temperatures being used, but the finish or neck, for instance, is actually cooled to prevent crystallization thereof. In this patent after the heat-setting step, it is stated that the container is cooled to a self-sustaining condition.

Accordingly, a need exists for a process for the production, at commercially acceptable speeds, of biaxially oriented, heat-set polyester, particularly poly(ethylene terephthalate), containers which containers exhibit low gas permeability, high mechanical strength including creep-resistance, thermal stability and high hoop yield strengths.

SUMMARY OF THE INVENTION

The present invention relates to a process for forming biaxially oriented heat-set, polyester containers having excellent gas barrier and mechanical properties.

In one embodiment of the invention, a polyester parison is heated to the orientation temperature, expanded by internal pressurization to biaxially orient the parison in a first hot heat-setting blow-mold, which mold has heated walls and thusly the container is heat-set to induce crystallization therein within the first mold. The biaxially oriented heat-set container is then transferred, under reduced but substantial enough internal pressure to prevent shrinkage, to a second cold mold which is larger in volume than the first hot heat-setting mold and is itself not a hot heat-setting mold but rather a cold walled mold wherein the container derived from the first hot heat-setting mold is again expanded under internal pressure to further biaxially orient the previously biaxially oriented, heat-set container without further heat-setting. The container is subsequently removed from the second cold mold and cooled to room temperature in ambient air. Such containers show excellent barrier properties as well as good thermal stability, creep-resistance and hoop yield strength.

In another embodiment of the invention, a polyester parison is heated to the orientation temperature, inserted in a first hot heat-setting mold and expanded under internal pressure to biaxially orient the parison to produce a fully formed container, which is heat-set to induce crystallization under internal pressure in the hot heat-setting mold. The heat-set container is removed from the first hot heat-setting mold under reduced but substantial enough internal pressure to prevent shrinkage and transferred to a second, larger internal volume hot heat-setting mold which is also heated to provide hot mold walls wherein the fully formed container, derived from the first hot heat-setting mold, is again biaxially stretched by expansion under internal pressure and also heat-set by forcing the container wall against the hot walls of the second hot heat-setting mold. The second mold is larger in internal volume than the first hot heat-setting blow-mold in internal volume. Subsequently, the twice biaxially oriented, twice heat-set container is cooled to room temperature. The container produced by this embodiment of the invention has excellent barrier properties as well as excellent mechanical properties and thermal stability.

DETAILED DESCRIPTION OF THE PREFERRED EMBODIMENTS

In the first embodiment of the present invention, a process and resulting container is disclosed for forming biaxially oriented, heat-set, i.e. partially crystalline, polyester containers having excellent gas barrier and mechanical properties. The first embodiment of the invention includes the following steps:

a polyester parison is heated to a temperature in the orientation temperature range;

the parison at orientation temperature is expanded by internal pressurization within a hot heat-setting blow-mold, which mold has heated walls, to biaxially orient and partially crystallize by heat-setting at least the wall portions of the container, formed by expansion of the parison, within the first hot heat-setting mold;

the biaxially oriented, partially crystallized, heat-set container formed in the first heat-setting mold is transferred under reduced yet substantial internal pressurization to a second cold mold, such reduced pressure being substantial enough positive pressure to prevent shrinkage of the container and simultaneously prevent premature balooning of the hot container walls;

the second cold mold, which is larger than the first hot heat-setting mold is closed about the container derived from the first hot heat-setting mold, and the container is again inflated under internal pressurization to further biaxially orient the previously biaxially oriented, heat-set container. The second cold mold is a relatively colder mold than the first hot heat-setting mold and maintained at a lower temperature so as to prevent any significant additional heat-setting from taking place in the second cold mold; and subsequent to the second blow molding step in the second, cold mold, the larger finished container, formed in the second cold mold, is removed from the cold mold and allowed to further cool to room temperature for filling or storage.

Such containers formed by the first embodiment of the invention disclosed above show excellent gas barrier properties with respect to the retention of carbon dioxide and the exclusion of oxygen from the internal spaces of the package. Also, containers so prepared show very high hoop yield stresses and thus superior resistance to sidewall deformation when used to package pressurized fluids. The characteristic of barrier properties are particularly important for oxygen sensitive foods and wines while high hoop yield stresses are needed for pressurized contents like soda and beer. Such containers also show excellent mechanical properties.

While the first embodiment of the invention disclosed immediately above is disclosed as relating to polyester parisons and the containers formed therefrom, the preferred embodiment of the invention relates to poly(ethylene terephthalate). Particularly preferred are poly(ethylene terephthalate) polymers having an inherent viscosity of at least 0.6 wherein the polymer contains at least 97% repeating units of ethylene terephthalate with the remainder being minor amounts of ester-forming components. Also useful are copolymers of ethylene terephthalate with up to about 10 mole percent of the copolymer being prepared from the monomer unit selected from butane-1,4-diol; diethylene glycol; propane-1,3-diol, poly(tetramethylene glycol); poly(ethylene glycol); poly(propylene glycol); 1,4-hydroxymethylcyclohexane and the like, substituted for the glycol moiety in the preparation of the copolymer, or isophthalic; naphthalene 1,4- or 2,6-dicarboxylic; adipic; sebacic; decane-1,10-dicarboxylic acids, and the like, substituted for the acid moiety (terephthalic acid) in the preparation of the copolymer.

Of course, the poly(ethylene terephthalate) polymer can include various additives that do not adversely affect the polymer or the processing according to the invention. For instance, some such additives are stabilizers, e.g., antioxidants or ultraviolet light screening agents, extrusion aids, additives designed to make the polymer more degradable, antistatic agents and dyes or pigments. Moreover, conventional cross-linking or branching agents can be included in small amounts in order to increase the melt strength of the preferred poly(ethylene terephthalate).

The invention is preferably practiced with conventional injection molded polyester parisons. Such parisons are generally elongate tubes of cylindrical cross-section which have an open upper threaded finish which accepts a closure; a cylindrical elongate main body portion; and a closed hemisphericl bottom portion. The parison when expanded results in a narrow neck container having a generally cylindrical main body portion and a closed hemispherical bottom portion. Such parisons and final container shapes are preferred but other geometrical configurations may be selected within the scope of the present invention.

In the preferred mode of practicing the first embodiment of the present invention, the first hot heat-setting mold is maintained at a temperature of between 100°–250° C., which is a temperature sufficient to induce substantial crystallization in the formed container as it is being heat-set within the mold after biaxial stretching upon inflation. The time of residence of the biaxially oriented container, once its walls are in contact with the mold, is less than five minutes. It has been discovered according to the present process that time periods of from one to ten seconds are sufficient to induce substantial crystallization when coupled with the second expansion and concomitant biaxial orientation in a second, larger, cold mold to produce the superior containers according to the present process. In the preferred embodiment, the mold volume of the first hot heat-setting mold is 70% of the volume of the second cold mold, i.e. the second mold is preferably about 1.4 times larger in total internal volume than the first mold.

The hot heat-setting mold equipment, parison handling, container transfer and cold mold equipment are all of conventional design and are not part of the invention.

Preferably, the parisons are injection molded and are preheated to the orientation range by conventional parison preheaters available in the market place.

Typically, a transfer time between the two molds is between three and fifteen seconds. Similarly, the reduced pressure needed for such transfer operation is between 20 and 24 psi.

As indicated above, the second cold mold has a volume about 1.4 times the volume of the first hot heat-setting mold in the preferred embodiment. However, generally speaking, according to the present process, the mold need only be slightly larger than the first hot heat-setting mold to achieve advantageous features of the present invention over conventional containers. However, as indicated above, preferably the first hot heat-setting mold is about 70% of the internal volume of the second cold mold and of the same general internal shape.

The second cold mold is typically operated at less than 100° C. so no significant additional heat-setting occurs and most preferably, according to the present invention, at a temperature of less than 25° C. for such reasons.

This first embodiment of the present invention is particularly advantageous for the production of small poly(ethylene terephthalate) containers. It is particularly well-suited for producing containers on the order of one half-liter in container internal volume, for use in high carbonation beverages like soft drinks and beer. The containers, according to the first embodiment of the present invention, are also particularly advantageous for the packaging of gas-sensitive contents like wine, cosmetics and foodstuffs, wherein a high gas barrier for the retention of internal packaging gases and the exclusion of external oxygen is necessary.

In the second embodiment of the present invention, a process and resulting container is disclosed for forming biaxially oriented, heat-set, i.e. partially crystalline, polyester containers having improved properties. The second embodiment of the invention includes the following steps:

heating a polyester parison to the orientation temperature range;

insertion of the hot parison into a first hot heat-setting mold and enclosing the mold thereupon;

expansion of the preheated parison enclosed in the first hot heat-setting mold by internal pressurization to biaxially orient the parison by inflation to produce a fully formed container which is heat-set by the internal pressurization of the parison forcing the walls of the container into close contact with the hot heat-setting mold walls;

the thusly heat-set container is subsequently removed under reduced yet substantial enough internal pressurization to prevent shrinkage, from the first hot heat-setting mold and transferred under such pressure to a second, larger hot heat-setting mold;

the formed container derived from the first hot heat-setting mold is again inflated to induce biaxial orientation while enclosed within the larger second hot heat-setting mold and maintained in close contact with the hot walls of the second larger hot heat-setting mold, by the internal pressurization, to again heat-set the container in the second hot heat-setting mold; and subsequently, the twice biaxially oriented, twice heat-set container is cooled to room temperature by removing the doubly oriented, doubly heat-set container from the second larger hot heat-setting mold under significant positive pressure and allowing the container to cool (a) externally, or (b) immediately transferring the doubly biaxially oriented, doubly heat-set container to a third cold mold which has approximately the same volume as the second hot heat-setting mold wherein it is cooled by contact with cold mold walls to a temperature of less than 100° C. and preferably a temperature of 25° or less, or in a third embodiment, (c) the doubly oriented, doubly heat-set container may be cooled in the second hot heat-setting mold itself by cooling the mold with a conventional heat transfer mechanism, for example, internal channeling for the passage of cold fluids through the mold.

In the preferred embodiment of practicing the second embodiment of the invention, the temperature of the first hot heat-setting mold is between 100°–250° C. and the residence time of the blown biaxially oriented container in the first mold is less than five minutes, preferably 1–10 seconds. The volume of the first hot heat-setting mold is approximately, in the most preferred embodiment, 70% of the volume of the second hot heat-setting mold such that the second hot heat-setting mold is approximately 1.4 times larger in total internal volume than the first hot heat-setting mold.

The formed container which is removed from the first hot heat-setting mold and transferred under significant positive pressure to the second larger hot heat-setting mold is most preferably transferred at between 20–24 psi pressure as set forth in the first embodiment of the invention.

The second larger internal volume hot heat-setting mold is, as disclosed above, in the most preferred embodiment about 1.4 times larger in total internal volume than the first hot heat-setting mold. While this is the most preferable volume ratio for the two hot heat-setting molds, a lesser volume differential may be used if desired and still achieve advantages relative to conventional containers. Typically, the second hot heat-setting mold is run at the same temperature as the first, i.e., 100°–250° C. The time of residence of the container in the second hot heat-setting mold after expansion is substantially less than 10 minutes and of the preferred process between one and five seconds.

The second embodiment of the invention is the most preferred process for forming highly thermally stable mechanically superior partially crystalline containers for pasturized foods like beer and foodstuffs. The first embodiment of the process is most preferred for forming containers which have high barrier properties, good mechanical properties and particularly high hoop yield stresses. The first embodiment is also particularly useful for containers for carbonated beverage packaging and oxygen sensitive food and cosmetics packaging.

All documents referred to herein are incorporated by reference.

The following Tables illustrate the superior properties of the containers formed according to the present invention as compared to conventional containers fabricated from PET, wherein PET represents poly(ethylene terephthalate) and where the containers are conventionally shaped narrow neck, cylindrical sidewalled containers having hemispherical bottoms.

Table I illustrates the improved characteristics of containers formed according to the first embodiment of the invention utilizing a first hot mold to induce heat-setting and a second larger internal volume cold mold to prevent additional heat-setting.

TABLE I

| Physical Property ↓ | Container Type → | Unheat-set biaxially oriented container of PET at Full size | | Biaxially oriented singly heat-set container of PET at Full size | | Biaxially oriented singly heat-set container of PET at 0.7× Full size | | Biaxially oriented singly heat-set hot mold, biaxially oriented, cold mold at Full size | |
|---|---|---|---|---|---|---|---|---|---|
| | | Axial | Hoop | Axial | Hoop | Axial | Hoop | Axial | Hoop |
| Modulus | Avg. | 404 | 955 | 443 | 799 | 513 | 790 | 482 | 978 |
| (psi × 10$^3$) | std. dev. | 9 | 65 | 20 | 47 | 27 | 93 | 17 | 65 |
| Yield Stress | Avg. | 12.7 | 33.5 | 14.1 | 31.5 | 16.4 | 22.3 | 13.8 | 40.8 |
| (psi × 10$^3$) | std. dev. | 0.5 | 2.8 | 0.5 | 1.7 | 0.8 | 1.6 | 0.2 | 1.7 |
| Yield Strain | Avg. | 6.3 | 5.6 | 5.9 | 6.0 | 6.3 | 6.0 | 6.1 | 6.0 |
| (percent) | std. dev. | 0.4 | 0.4 | 0.2 | — | 0.1 | — | 0.2 | — |
| Ultimate | Avg. | 16.3 | 35.0 | 11.5 | 44.8 | 14.4 | 37.6 | 14.4 | 46.1 |
| Strength (psi × 10$^3$) | std. dev. | 1.0 | 1.7 | 0.2 | 1.7 | 1.1 | 1.6 | 0.8 | 2.8 |
| Ultimate | Avg. | 78 | 10 | 42 | 17 | 46 | 22 | 38 | 13 |
| Elongation | std. dev. | 8 | 1 | 9 | 4 | 8 | 2 | 10 | 1 |
| Density | | | | | | | | | |
| Position 1 | | 1.3599 | | 1.3920 | | 1.3950 | | 1.3894 | |
| Position 2 | | 1.3590 | | 1.3960 | | 1.3970 | | 1.3931 | |

As defined in Table I, position 1 is a sample of material taken from a position four inches from the top of the container while position two samples are taken from a position six inches from the top of the container.

The data illustrated in Table I was generated using PET parisons of 22 gram weight suited for forming one-half liter internal volume containers.

The half-liter beverage parison used has an overall length of 3.970 inches. The outer diameter of the body portion of the parison just below the finish region is 0.760 inch. There is a 0° 28 minute inward taper along the parison length resulting in a 0.728 inch outer diameter at the hemi-bottom end of the parison. The wall thickness is maintained at 0.134 inch throughout the body of the parison. The inside diameters in this regions are 0.626 inch at the finish end and 0.594 inch at the bottom end. The finish is a conventional beverage container finish. Three types of containers were prepared from parisons identical to the PET parisons used with the inventive process for comparison with the improved containers according to the first embodiment of the invention, they are:

(1) A conventional blow molded PET container formed by blow molding the parison at orientation temperature in a cold mold at a final size of one-half liter so as to induce biaxial orientation;

(2) A container blow molded as above under conditions to biaxially orient the containers and simultaneously heat-set by contacting the container walls with a hot mold to induce heat-setting and concommitant increase in crystallinity and density, the size of the final continers being one-half liter;

(3) A container blow molded as above under conditions to biaxially orient the containers and simultaneously heat-set by contacting the container walls with a hot mold to induce heat-setting and thus partial crystallization except that the mold volume is 0.7 of the size of a one-half liter mold used for the containers of (1), (2) and (4) below; and (4) A container of full one-half liter size manufactured as defined above according to the first embodiment of the invention and particularly with the first hot mold temperature at 230° C., time of residence after expansion in the first hot mold 1.3 seconds, transfer time between molds 8 seconds, transfer pressure in container of 22 psi, temperature of second cold mold at 25° C. and time of residence in second mold after completion of expansion at 1.3 seconds.

For containers (2) and (3), the heat-setting temperature was 225° C., the crystallization time after completion of inflation is 1.3 seconds.

As Table I clearly illustrates that containers fabricated according to the first embodiment of the invention are superior in overall mechanical properties and accordingly barrier properties to the other containers of the test.

Of particular importance is the recognition that the containers of this invention show an average hoop yield stress significantly higher than any of the other conventionally formed containers. As pointed out above, hoop yield stress is a critical property as it relates to the ability of small containers to hold highly pressurized food products, like carbonated soft drinks.

Note also that containers according to the present invention are also significantly higher in ultimate strengths than are either the unheat-set biaxially oriented containers at full size or the biaxially oriented singly head-set containers of 0.7 full size.

With respect to the physical properties described in Table I, such properties are defined herein as follows.

Modulus is the measure of the stiffness of the containers, as defined by ASTM standard D-638.

Yield stress is defined as the resistance to creep under heat and/or pressure of a container wall portion, as defined by ASTM standard D-638.

Yield strain is defined as the percent of elongation to which a section of containers may be subjected and then not return 100% to its original dimensions by elastic recovery, as defined by ASTM standard D-638.

Ultimate strength is a measure of the internal pressurization which a container can tolerate prior to irrevocable rupture, as defined in ASTM standard D-638.

Ultimate elongation is a measure of impact strength of the material, as defined in ASTM standard D-638.

To further define the manufacture condition of the containers represented in Table I, the extension ratios for the parisons blown in the 0.7×half-liter size mold were an average hoop extension of 3.99X and an average axial extention of 2.36X. For the overall extension of the parison from the preblown parison shape to the final shape when blown into a one-half liter mold the average hoop extension ratio was 4.69X and the average axial extension was 2.43X.

For the container according to the first embodiment of the invention which are twice expanded, i.e., once in the first hot mold and a second time in the cold mold, the cylindrical sidewall portion has a volume expansion of 1.37X; a hoop extension of 1.17X and an axial extension of 1.0X. The hemispherical bottom portion has a volume expansion of 1.53X; a hoop extension of 1.15X and an axial extension of 1.15X. The overall extension is a volume extension of 1.43X; a hoop extension of 1.17X and an axial extension of 1.02X.

Table II illustrates the improved resistance to shrinkage and to gross deformations in shape upon exposure to elevated temperature of containers prepared according to the second embodiment of the invention. In hot filled foods, like catsup or soy sauce, and pasteurized foods, like beer, it is critical that plastic containers not only have good barrier properties and mechanical strength but also resist shrinkage and gross deformation upon exposure to elevated hot filling and pasturization temperatures.

Table II compares unheat-set biaxially oriented containers blown against cold mold walls in a full size one-half liter mold and biaxially oriented heat-set in a hot mold of full one-half liter size with containers prepared by both the first and second embodiments of the present invention.

TABLE II

| Physical Property ↓ | Container Type → | Unheat-set biaxially oriented container of PET | Biaxially oriented, singly heat-set container of PET | Biaxially oriented, heat-set hot mold, biaxially oriented, cold mold | Biaxially oriented heat-set hot mold, biaxially oriented heat-set hot mold |
|---|---|---|---|---|---|
| Volume Reduction after Exposure for 5 minutes at 90° C. (percent change) | | 16.4 | 1.4 | 8.9 | 0.9 |
| Gross Deformation in Shape | | yes | no | no | no |
| Production Conditions | | | | | |
| Temperature Mold One (°C.) | | 25 | 230 | 230 | 230 |
| Time in Mold One (second) | | 1.3 | 1.3 | 1.3 | 1.3 |
| Temperature Mold Two (°C.) | | — | — | 25 | 240 |
| Time in Mold Two (seconds) | | — | — | 1.3 | 3–4 |

As illustrated by the data, containers prepared by the dual hot mold, a second embodiment of the invention are superior to all other tested containers in both (1) resistance to shrinkage (shrinkage less than one percent) and (2) showing no gross deformation.

Additionally, the biaxially oriented, heat-set hot mold and subsequently biaxially oriented and heat-set again in hot mold containers described also have superior mechanical properties. The containers show a yield stress of 16,900 psi±500 psi axial and of 36,000 psi±1,800 psi hoop. Thus, the containers of the second embodiment show superior yield stress number than even singly heat-set containers. This is highly unexpected since it is generally known in films that any heat-setting step will lower the yield stress of the film article. I have discovered that not only do properties related to shrinkage improve with double heat-setting in a larger mold but so does the important mechanical property of yield stress.

Conventionally prepared biaxially oriented unheat-set containers show large shrinkage as well as gross structural deformation. Containers prepared by the first, i.e., hot mold, cold mold, embodiment of the invention, show good resistance to gross deformation but shrink in overall dimension to a large extent. Biaxially oriented containers which are singly heat-set show resistance to deformation but still are substantially more prone to shrinkage than are the containers of the second embodiment of the invention.

Accordingly, containers according to the first embodiment of the invention are excellent for the retention of pressurized food products due to good barrier properties and high mechanical properties particularly high hoop yield stress. Containers according to the second embodiment are also excellent in respect of barrier properties and mechanical properties but also show excellent resistance to shrinkage and gross deformation at elevated food packaging and processing temperatures.

Accordingly, what is claimed is:

1. A process for fabricating a partially crystalline, biaxially oriented hollow plastic container article comprising:
   (1) enclosing a plastic parison which is at a temperature within its molecular orientation temperature range within a first blow which first blow mold is at a temperature sufficient to induce crystallization into said plastic upon contact of said plastic with said blow mold;
   (2) expanding said plastic parison within said first blow mold by internal pressurization while still within the molecular orientation temperature range to induce biaxially orienting in said plastic and force said plastic parison into intimate contact and conformance with said first blow mold to form a biaxially oriented container and by such internal pressurization maintaining contact between said first mold and said biaxially oriented container for a time sufficient to induce partial crystallization into said biaxially oriented container;
   (3) transferring said partially crystallized, biaxially oriented container from said first blow mold to a second blow mold, said transfer occurring with sufficient internal pressurization of said partially crystallized biaxially oriented container to prevent significant shrinkage during said transfer;
   (4) enclosing said partially crystalline biaxially oriented container in said second blow mold, which said second blow mold is (a) at a temperature which is not sufficient to induce significant crystallization in said plastic of said container and (b) which is larger in internal volume than said first blow mold;
   (5) expanding by internal pressurization said partially crystalline biaxially oriented container within said second blow mold into intimate contact and conformance with said second blow mold to form a larger container and again biaxially orient the material of said partially crystallized biaxially oriented container derived from said first blow mold; and
   (6) subsequently removing the resultant container from said second blow mold and reducing the internal pressure to ambient pressure.

2. The process defined in claim 1 wherein said plastic is poly(ethylene terethalate) and said first blow mold is at a temperature between 100° C. and 250° C. and said second blow mold is at a temperature of about 100° C. or less.

3. The process defined in claim 1 wherein said plastic is maintained in contact with said first blow mold for a time between 1 second and 5 minutes.

4. The process defined in claim 1 wherein the internal volume of said first blow mold is about 0.7 times the internal volume of said second blow mold.

5. A process for fabricating a partially crystalline, biaxially oriented hollow plastic container article comprising:
   (1) enclosing a plastic parison which is at a temperature within the molecular orientation temperature range in a first blow mold, which first blow mold is at a temperature sufficient to induce crystallization into said plastic upon contact of said plastic with said blow mold;
   (2) expanding by internal pressurization said plastic parison within said first blow mold while still within the molecular orientation temperature range to induce biaxial orientation into said plastic and force said plastic parison into intimate contact and conformance with said first blow mold to form a biaxially oriented container and by such internal pressurization, maintaining contact between said biaxially oriented container and said first blow mold for a time sufficient to induce partial crystallization into said biaxially oriented container;
   (3) transferring said partially crystallized, biaxially oriented container from said first blow mold to a second blow mold, said transfer occurring with sufficient internal pressurization of said partially crystallized biaxially oriented container to prevent significant shrinkage during said transfer;
   (4) enclosing said partially crystallized biaxially oriented container in said second blow mold, which second blow mold is (a) at a temperature suffcient to induce additional crystallization into said partially crystalline biaxially oriented container upon contact with said second blow mold and (b) which is larger in internal volume than said first blow mold;
   (5) expanding by internal pressurization said biaxially oriented partially crystallized container within said second blow mold into intimate contact and conformance with said second blow mold to form a larger container and to again biaxially orient and partially crystallize the biaxially oriented and partially crystallized container derived from said first blow mold; and (6) subsequently removing the resulting container from said second blow mold and reducing the pressure to ambient pressure.

6. The process defined in claim 1 wherein said plastic is poly(ethylene terephthalate) and said first and second blow molds are each at a temperature between 100° C. and 250° C.

7. The process defined in claim 1 wherein said plastic is maintained in contact with said first and second blow molds for a time between 1 second and 5 minutes.

8. The process defined in claim 1 wherein said first blow mold is about 0.7 times the internal volume of said second blow mold.

* * * * *